US 7,779,078 B2

(12) United States Patent  (10) Patent No.: US 7,779,078 B2
Bang  (45) Date of Patent: Aug. 17, 2010

(54) METHOD AND SYSTEM FOR MANAGING MULTIMEDIA MESSAGES IN A MOBILE COMMUNICATION SYSTEMS

(75) Inventor: Hyo-Sik Bang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1132 days.

(21) Appl. No.: 11/351,503

(22) Filed: Feb. 10, 2006

(65) Prior Publication Data

US 2006/0187875 A1   Aug. 24, 2006

(30) Foreign Application Priority Data

Feb. 18, 2005  (KR)  ............ 10-2005-0013606

(51) Int. Cl.
G06F 15/16  (2006.01)
(52) U.S. Cl. ............ 709/206; 709/229; 455/412.1
(58) Field of Classification Search ............ 709/206, 709/207, 236, 246, 229; 370/312, 490; 455/412.1, 455/410, 466
See application file for complete search history.

(56) References Cited

U.S. PATENT DOCUMENTS

| 7,334,050 | B2* | 2/2008 | Zondervan et al. | 709/246 |
| 2003/0193967 | A1* | 10/2003 | Fenton et al. | 370/490 |
| 2004/0071136 | A1 | 4/2004 | Laumen et al. | |
| 2004/0111481 | A1* | 6/2004 | Kim | 709/206 |
| 2004/0242202 | A1* | 12/2004 | Torvinen | 455/412.1 |
| 2005/0021834 | A1* | 1/2005 | Coulombe | 709/236 |
| 2005/0138123 | A1* | 6/2005 | Yun et al. | 709/206 |
| 2005/0159135 | A1* | 7/2005 | Kim | 455/410 |
| 2005/0198183 | A1* | 9/2005 | Zilliacus et al. | 709/207 |
| 2005/0250520 | A1* | 11/2005 | Johnson et al. | 455/466 |
| 2005/0270994 | A1* | 12/2005 | Caloud et al. | 370/312 |

FOREIGN PATENT DOCUMENTS

| EP | 1 447 999 | 8/2004 |
| KR | 10-2003-0043870 | 6/2003 |
| WO | WO 2004/086254 | 10/2004 |
| WO | WO 2004/114693 | 12/2004 |

OTHER PUBLICATIONS

Yahoo? Photos, Apr. 13, 2001.

* cited by examiner

*Primary Examiner*—Jungwon Chang
(74) *Attorney, Agent, or Firm*—The Farrell Law Firm, LLP

(57) ABSTRACT

A system and method for managing multimedia messages, wherein a mobile terminal for sends a multimedia message including multimedia data having a storage directory and a disclosure level set according by a user, a multimedia messaging service center stores the multimedia data included in the multimedia message in a directory of a multimedia message box corresponding to the set storage directory, and a web server detects an access level of a web user requesting access to the multimedia data, and offers the multimedia data stored in the corresponding directory to the web user, when the detected access level is identical to the disclosure level set for the multimedia data.

20 Claims, 6 Drawing Sheets

1. Bcc field
2. Cc field
3. X-Mms-Content-Location field
4. Content-Type field
5. Date field
6. X-Mms-Delivery-Report field
7. X-Mms-Delivery-Time field
8. Delta-seconds-value
9. Encoded-string-value
10. X-Mms-Expiry field
11. From field
12. X-Mms-Previously-Sent-By field
14. X-Mms-Message-Class field
15. Message-ID field
16. X-Mms-Message-Type field
17. X-Mms-Message-Size field
18. X-Mms-MMS-Version field
19. X-Mms-Priority field
20. X-Mms-Read-Report field
21. X-Mms-Read-Status field
22. X-Mms-Reply-Charging field
23. X-Mms-Reply-Charging-Deadline field
24. X-Mms-Reply-Charging-ID field
25. X-Mms-Reply-Charging-Size field
26. X-Mms-Report-Allowed field
27. X-Mms-Response-Status field
28. X-Mms-Response-Text field
29. X-Mms-Retrieve-Status field
30. X-Mms-Retrieve-Text field
31. X-Mms-Sender-Visibility field
32. X-Mms-Status field
33. Subject field
34. To field
35. X-Mms-Transaction-Id field
36. X-Mms-Media-Permission
    Media Access Permission ~101
37. X-Mms-Media-Directory
    Directory Text Name. ~103

FIG.3

METHOD AND SYSTEM FOR MANAGING
MULTIMEDIA MESSAGES IN A MOBILE
COMMUNICATION SYSTEMS

PRIORITY

This application claims priority to an application entitled "Method and System for Management of Multimedia Messages in Mobile Communication System" filed with the Korean Intellectual Property Office on Feb. 18, 2005 and assigned Ser. No. 2005-13606, the contents of which are incorporated herein by reference.

BACKGROUND OF THE INVENTION

1. Field of the Invention

The present invention relates generally to a multimedia message service in a mobile communication system and, more particularly to a method and system for managing multimedia messages in a mobile communication system.

2. Description of the Related Art

Presently, mobile terminals have advanced beyond merely being telephones and now integrate various additional functions. Particularly, it is common for mobile terminal to include a digital camera, and provide various music and movie functions. Further, to meet the increasing demand for such additional functions, mobile communication systems now offer a multimedia messaging service (MMS) that delivers multimedia content as a message between mobile terminals. For example, the multimedia messages may include photographs, movies, music, etc.

Multimedia messages delivered using MMS are generally big in size. Accordingly, individual users of mobile terminals have to selectively store multimedia messages in a data storage server such as a multimedia message box (MM box) linked to a multimedia messaging service center (MMSC). If necessary, they can download the stored multimedia messages or transmit them to any recipient terminal. Generally, peer-to-peer transmission using an MMS protocol is used to send multimedia messages to the MMS box. This transmission, however, is a simple data upload technology that unconditionally forwards and sequentially stores the multimedia messages, without sorting the messages in different directories.

Therefore, it may be difficult for users to manage the multimedia messages stored in such a manner. Accordingly, it is necessary to provide an improved method for management of multimedia messages.

SUMMARY OF THE INVENTION

Accordingly, the present invention has been designed to solve the above and other problems occurring in the prior art.

An object of the present invention is to provide a method and system for conveniently managing multimedia messages.

Another object of the present invention is to provide a method and system for effectively managing multimedia messages.

In order to accomplish the above and other objects of the present invention, there is provided a method for management of multimedia messages in a mobile communication system. The method includes: transmitting a multimedia message including multimedia data having a storage directory and a disclosure level set by a user; storing, by a multimedia message service center, the multimedia data included in the multimedia message in a directory of a multimedia message box corresponding to the set storage directory; and detecting, by a web server, an access level of a web user requesting access to the multimedia data and offering the multimedia data stored in the corresponding directory to the web user, when the detected access level is identical to the disclosure level set for the multimedia data.

In accordance with another aspect of the present invention, there is provided a system for managing multimedia messages. The system includes: a mobile terminal for sending a multimedia message including multimedia data having a storage directory and a disclosure level set by a user; a multimedia messaging service center for storing multimedia data included in the multimedia message in a directory of a multimedia message box corresponding to the set storage directory; and a web server for detecting an access level of a web user requesting access to the stored multimedia data and offering the stored multimedia data to the web user, when the detected access level is identical to the disclosure level set for the multimedia data.

BRIEF DESCRIPTION OF THE DRAWINGS

The above and other objects, features, and advantages of the present invention will be more apparent from the following detailed description taken in conjunction with the accompanying drawings, in which:

FIG. 3 is a view illustrating a header structure of a multimedia message according to a preferred embodiment of the present invention;

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations incorporated herein will be omitted when it may obscure the subject matter of the present invention.

Figure 1:
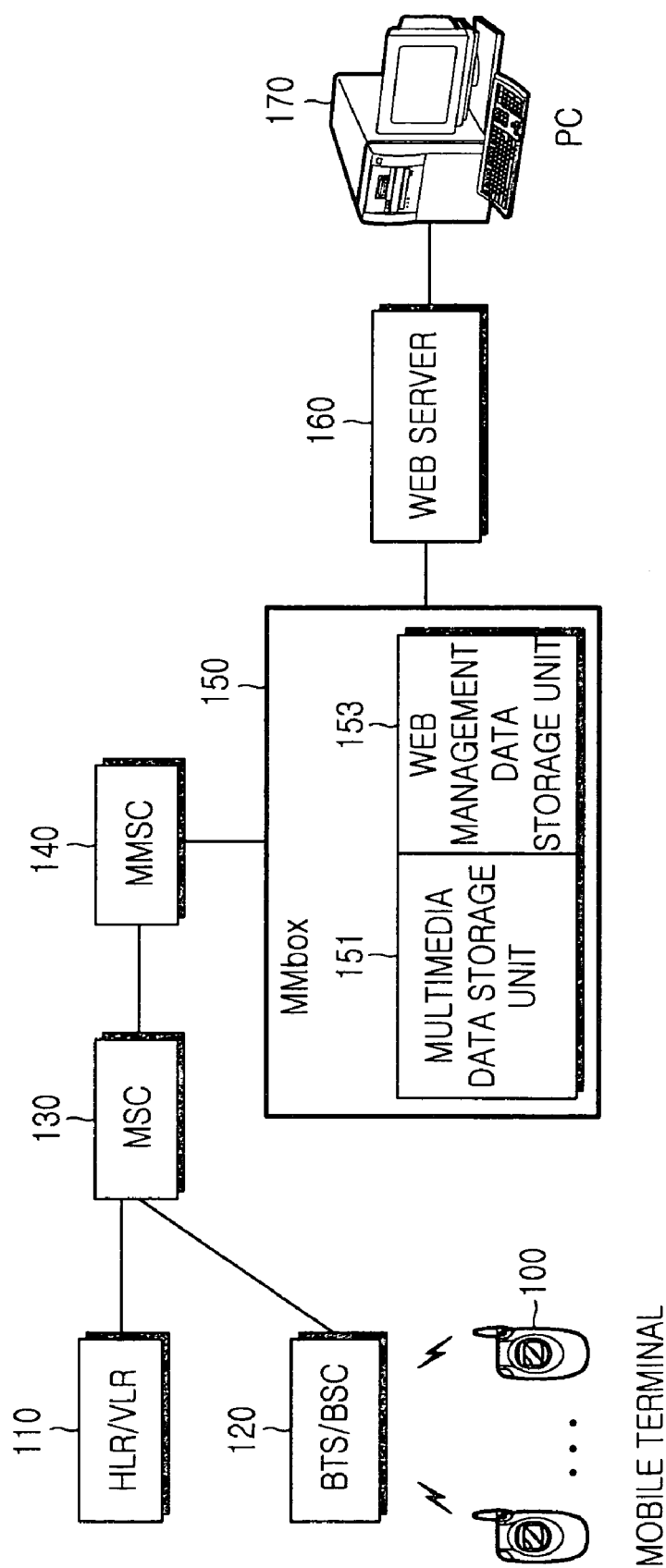
FIG. 1 is a view illustrating a multimedia message management system according to a preferred embodiment of the present invention.

FIG. 1 illustrates a mobile communication system for management of multimedia messages according to a preferred embodiment of the present invention. Referring to FIG. 1, the mobile communication system includes a plurality of mobile terminals 100, a home location register/visitor location register (HLR/VLR) 110, a base transceiver station/base station controller (BTS/BSC) 120, a mobile switching center (MSC) 130, a multimedia messaging service center (MMSC) 140, a multimedia message box (MM box) 150, a web server 160, and a personal computer (PC) 170.

The BTS/BSC 120 communicates with the mobile terminals 100 through a radio interface and controls wireless and wired links. Also, the BTS/BSC 120 manages handoff procedures to ensure continuity of a call as a subscriber moves from one cell to another and transfers location and status data of each mobile terminal to the MSC 130.

The MSC 130 interworks with other MSCs to handle calls to or from the mobile terminals 100 and queries the HLR/VLR 110 for subscriber data. The MSC 130 stores location and status data received from the BTS/BSC 120 in the HLR/VLR 110. The HLR/VLR 110 is a database for storing and processing information about subscribers.

The MM box 150 is a data storage server for storing multimedia messages received from the subscribers, and more particularly, multimedia data included in the multimedia messages. According to a preferred embodiment of the present invention, the MM box 150 consists of a multimedia data storage unit 151 and a web management data storage unit 153. The multimedia data storage unit 151 stores multimedia data contained in the multimedia messages received by the MM box 150 through the MMSC 140. The multimedia data storage unit 151 is divided into multiple areas so that each mobile terminal 100 can be assigned one storage area.

Users of the mobile terminals 100 can send multimedia messages in order to store multimedia data included in the multimedia message in the assigned storage area within the multimedia data storage unit 151 or can delete specific multimedia data previously stored in that storage area. If necessary, the users can download the stored multimedia data or send it to any recipient terminal or a multimedia service server using a multimedia message. Multimedia data stored in the multimedia data storage unit 151 of the MM box 150 is managed through the MMSC 150. The web management data storage unit 153 stores data generated, deleted, or renewed by the web server 160 in relation to the multimedia data stored in the multimedia data storage unit 151.

The mobile terminals 100 communicate with the BTS/SBC 120 through a radio interface and implement various communication services offered by the mobile communication system. Also, the mobile terminals 100 implement the MMS (Multimedia Messaging Service). More specifically, when sending a multimedia message to the MM box 150, the mobile terminals 100 designate a directory in which the multimedia message will be stored and a disclosure level of the multimedia message, thereby determining the storage directory and disclosure level of the multimedia data included in the multimedia message.

Figure 2:
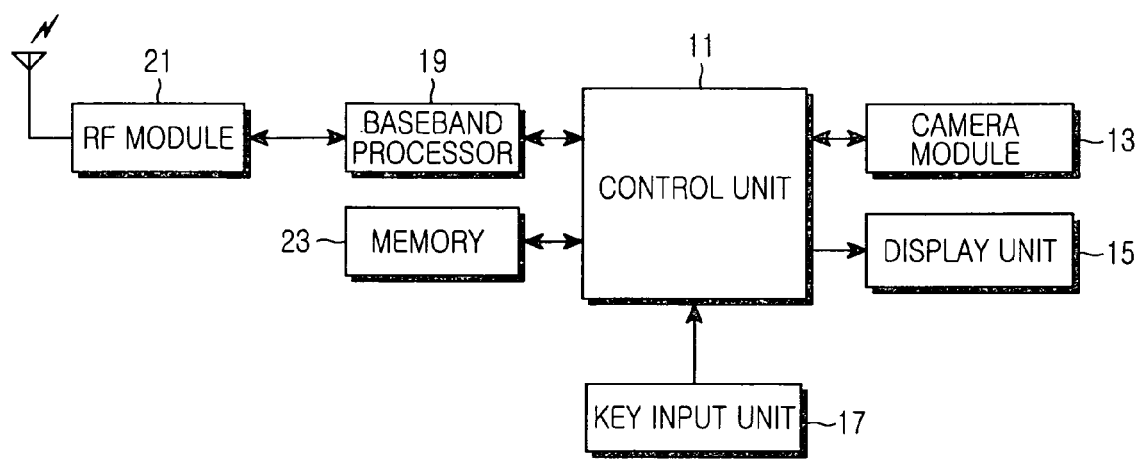
FIG. 2 is a block diagram of a mobile terminal to which the present invention is applicable.

FIG. 2 is a block diagram of a mobile terminal in the mobile communication system according to a preferred embodiment of the present invention. As illustrated in FIG. 2, the mobile terminal 100 includes a control unit 11, a camera module 13, a display unit 15, a key input unit 17, a baseband processor 19, an RF module 21, a memory 23 and an audio processor 25.

The camera module 13 outputs image frames obtained by an image sensor. The display unit 15 displays various image data and information received from a base station or stored in the memory 23 under the control of the control unit 11.

Preferably, the key input unit 17 is provided with keys numbered 0 to 9, a # key, a * key, a direction key and a plurality of function keys (such as menu, select, send, cancel, power and volume keys) for performing various functions available in the mobile terminal. The key input unit 17 transmits input data corresponding to a key pressed by a user to the control unit 11.

The RF (Radio Frequency) module 21 transmits and receives RF signals to and from the base station through an antenna. The RF module 21 modulates a signal input from the control unit 11 through the baseband processor 19 and transmits the modulated RF signal through the antenna. Further, the RF unit 21 demodulates an RF signal received through the antenna and transfers the signal to the control unit 11 through the baseband processor 19. The baseband processor 19 processes baseband signals transmitted or received between the RF module 21 and the control unit 11.

The memory 23 stores programs for any processing or control by the control unit 11, reference data, updateable data, and various types of multimedia data to serve as a working memory for the control unit 11. Multimedia data transmitted as part of an MMS message includes, for example, sound, movies, images, photographs, or text data.

The memory 23 also stores program data necessary for the MMS and data relating to a multimedia message management menu according to the present invention. The multimedia message management menu is used to set a storage directory and a disclosure level of a multimedia message, which will be stored in the MM box 150. The storage directory may have already been created in the MM box 150 or newly be generated to store multimedia data contained in the multimedia message. The user can set a storage directory by inputting the storage directory name when sending a multimedia message according to the present invention.

The disclosure level is a level of access to the multimedia data stored in the MM box 150 through the web server 160. For example, the level can be any of an open access level, a group access level and an administrator access level. The open access level allows anyone accessing the web server 160 to have complete and unrestricted access to the multimedia data. The group access level allows only a specific group of people to access the multimedia data through the web server 160. The administrator access level allows only registered users of the mobile terminals 100 to access the multimedia data through the web server 160. Accordingly, it is possible to set a disclosure level of multimedia data by selecting one of these three levels previously stored in the memory 23 when sending a multimedia message.

The control unit 11 controls overall operations, including calls, data communications, and additional functions of the mobile terminal. In accordance with the present invention, the control unit 11 sends a multimedia message including multimedia data having information about the storage directory and disclosure level, which have been set by the user for the message. More specifically, the information about the storage directory and disclosure level is included in a header field of the multimedia message.

FIG. 3 is a view illustrating a header structure of a multimedia message according to a preferred embodiment of the present invention. As illustrated in FIG. 3, the header of a multimedia message contains information necessary for transmission of the multimedia message, including the data length, data type, sender/recipient addresses and billing. In accordance with the present invention, the header includes a level field 101 for recording the disclosure level of the multimedia message and a directory text name field 103 for recording the name of the storage directory of the multimedia message in a text format.

Figure 4:
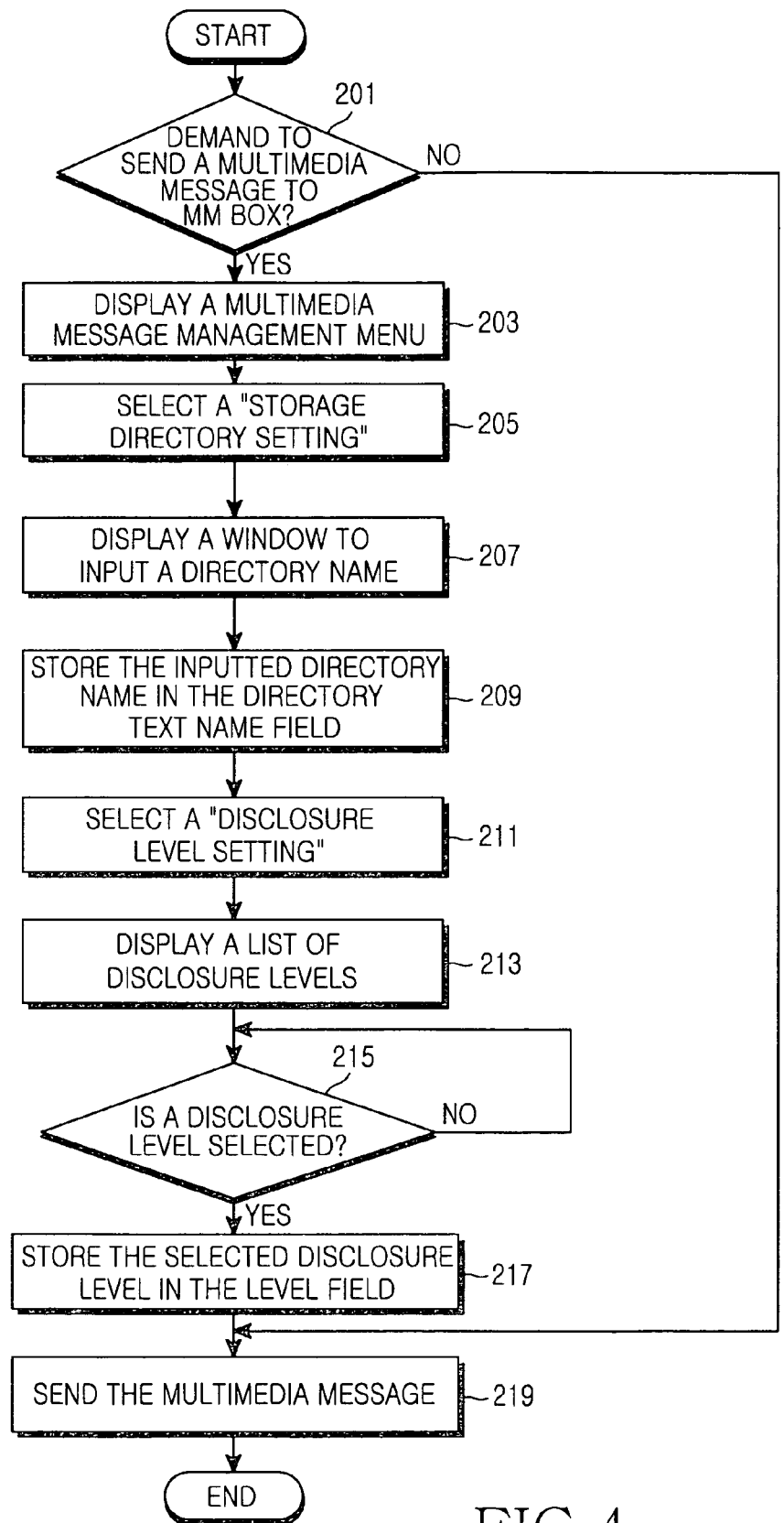
FIG. 4 is a flow chart illustrating operations of a mobile terminal according to a preferred embodiment of the present invention.

FIG. 4 is a flow chart illustrating operations of a mobile terminal 100 according to a preferred embodiment of the present invention. Referring to FIG. 4, at step 201, the control unit 11 of the mobile terminal 100 detects if the user has input a request for sending a multimedia message. When the request is to send the multimedia message to any other destination or mobile terminal, the control unit 11 proceeds to step 219. However, when the request is to send a multimedia message to the MM box 150, the control unit 11 displays a multimedia message management menu consisting of items such as "storage directory setting" and "disclosure level setting."

In step 205, the user selects the "storage directory setting" item, and then the control unit 11 displays a window to enable the user to input a desired storage directory name in step 207. A directory having the input name may have already been created and present in the multimedia message storage unit 151 of the MM box 150 or newly be generated to store multimedia data contained in the multimedia message.

At step 209, the control unit 11 stores the directory name input by the user in the directory text name field 103. The user selects the "disclosure level setting" item at step 211, and then the control unit 11 displays a list of disclosure levels such as an open access level, a group access level, and an administrator access level at step 213. The controller then waits until the user selects a desired one from the listed levels in step 215.

At step 217, the control unit 11 stores the selected disclosure level in the level field 101. At step 219, the control unit 11 sends the multimedia message and terminates the message transmission process.

As described above, each user of the mobile terminals 100 can set the storage directory and disclosure level of a multimedia message which will be stored in the MM box 150. Deletion or name change of any storage directory in the MM box 150 and deletion, directory change, or name change of any multimedia message stored in the MM box 150 are managed through the web server 160. Because of current technical limitations, it is difficult for the mobile terminals 100 to directly manage the stored multimedia data or the storage directories. To effectively manage the stored multimedia messages through the web server 160, the mobile terminals 100 need only perform the most basic operations, such as storage directory creation or designation and disclosure level setting for each multimedia message.

Referring back to FIG. 1, a multimedia message sent from a mobile terminal 100 through the above process is delivered to the MMSC 140 via the BTS/BSC 120 and the MSC 130. The MMSC 140 performs overall operations for multimedia message transmission over MMS between mobile terminals 100 and MMS services between various multimedia service servers and mobile terminals 100 through wireline or wireless Internet networks. In addition, the MMSC 140 stores multimedia data contained in the multimedia message received from the mobile terminal 100 in the MM box 150.

At this time, the MMSC 140 analyzes the header of the received multimedia message to identify the storage directory set for the multimedia message. The MMSC 140 searches the multimedia data storage unit 151 to detect the same storage directory in the multimedia storage unit 151. If the same storage directory is present, the MMSC 140 will store the multimedia data contained in the received multimedia message in that storage directory. However, if the same storage directory is not present, the MMSC 140 will create a new directory to store the multimedia data.

Figure 5:
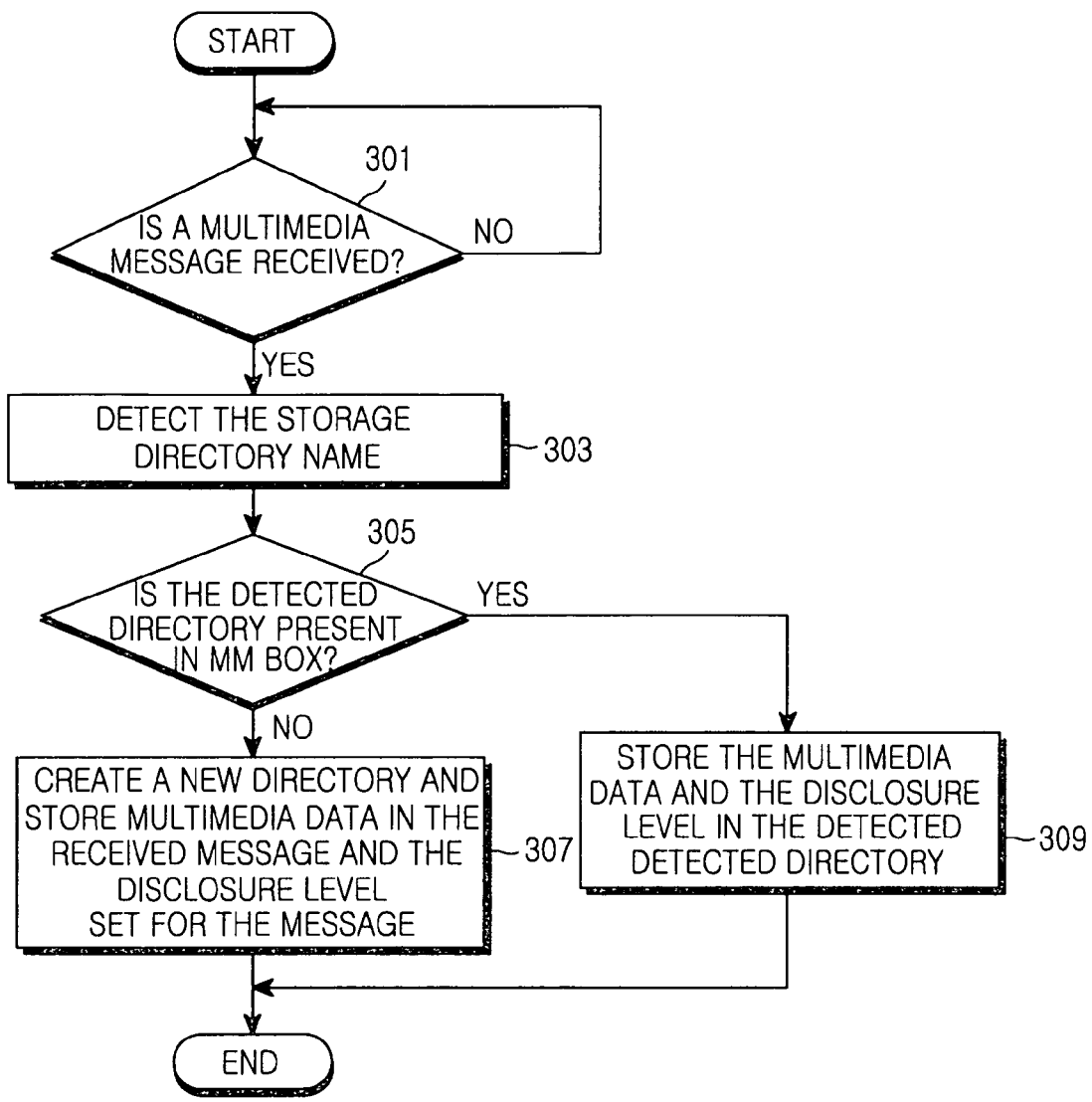
FIG. 5 is a flow chart illustrating operations of an MMSC according to a preferred embodiment of the present invention.

FIG. 5 is a flow chart illustrating operations of an MMSC according to a preferred embodiment of the present invention. Referring to FIG. 5, when the MMSC 140 receives a multimedia message from a mobile terminal 100 at step 301, a storage directory name is detected from the received multimedia message at step 303. At step 305, the MMSC 140 determines if a directory having the detected directory name is present in the storage area assigned to the mobile terminal 100 within the multimedia data storage unit 151. If the directory is present in the multimedia data storage unit 151, the MMSC 140 stores the multimedia data and the disclosure level set for the multimedia message in the directory detected in the multimedia data storage unit 151 and terminates the data receiving/storing operations. However, if the directory is not present in the multimedia data storage unit 151, the MMSC 140 generates a new directory and stores the multimedia data contained in the received multimedia message, together with the disclosure level set for the multimedia message, in the newly generated directory at step 307.

Referring to FIG. 1, the multimedia data stored in the MM box 150 can be accessed by users of the web server 160, which is directly connected to the MM box 150. The web server 160 offers the multimedia data stored in the MM box 150 to the web users accessing the web server 160. The web users can access the web server 160 via the PC 170 that is connected to the web server 160 through a wireline network such as the Internet. The web server 160 offers the multimedia data to the PC 170 according to the storage condition of each multimedia data in the MM box 150, i.e., as sorted by directory and disclosure level. The web server 160 has an interface capable of providing the multimedia data stored in the MM box 150 to the PC 170.

In order to provide the multimedia data according to the disclosure level set for each multimedia data, the web server 160 stores information about the access level assigned to each web user who accesses the web server 160. Access levels assigned to the web users are identical to the disclosure levels that can be set for the multimedia data. The access levels are determined by the administrator of the web server 160 and the user of each mobile terminal 100 who sends a multimedia message to the MM box 150. The web server 160 offers basic web services enabling the users of the mobile terminals 100 and the web users of the web server 160 to input a simple comment concerning a specific multimedia message stored in the MM box 150. The web server 160 provides an interface for the users of the mobile terminals 100, i.e., users having the administrator access level, to manage the storage directories in the MM box 150 by such operations as deletion, name change or change of disclosure level of any storage directory or directory change of any multimedia data.

The web server 160 also provides an interface for management of the multimedia data stored in the MM box 150, such as deletion, change of name, copy or change of disclosure level of any multimedia data. Data generated in relation to such changes of the multimedia data through the web server 160 is stored in the web management data storage unit 153 of the MM box 150 to correspond to the relevant multimedia data.

Figure 6:
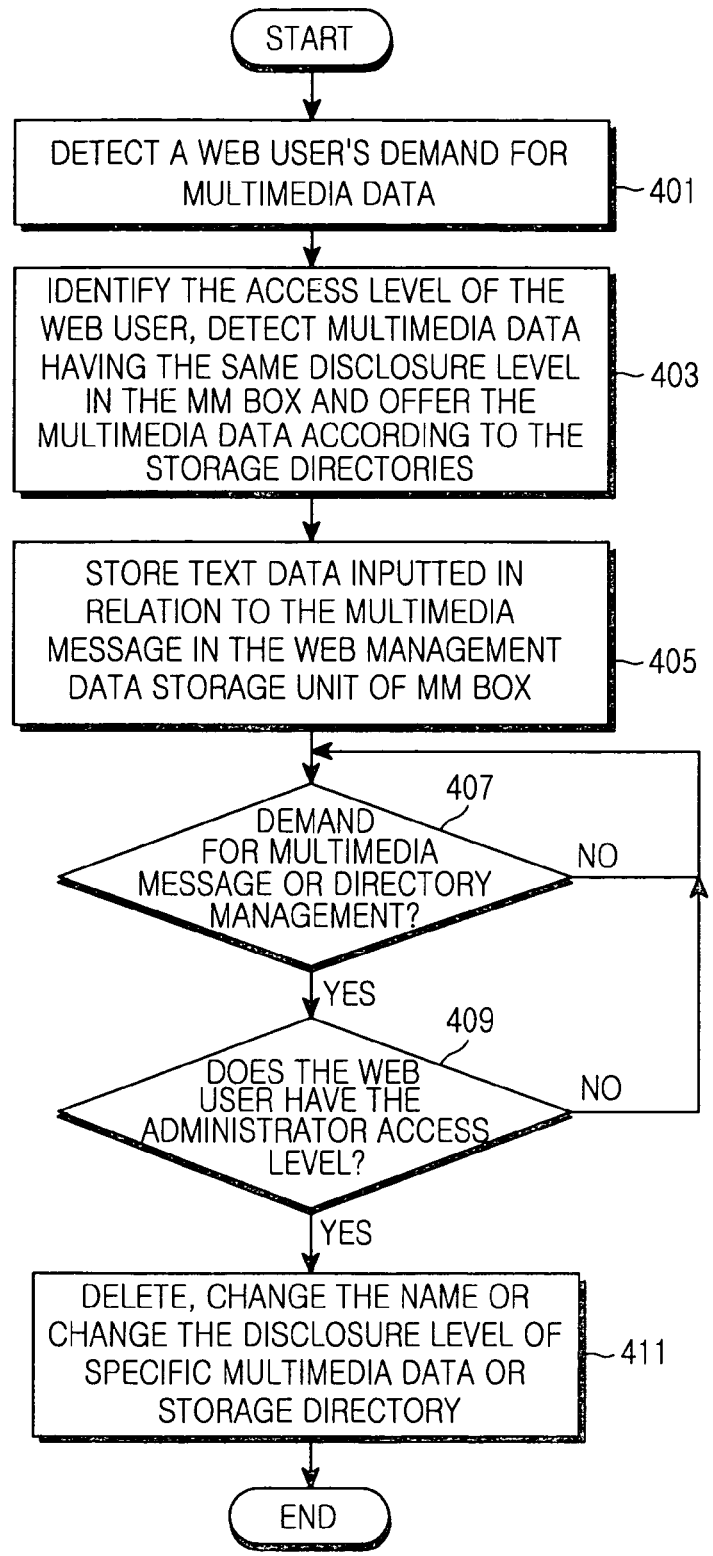
FIG. 6 is a flow chart illustrating operations of a web server according to a preferred embodiment of the present invention.

FIG. 6 is a flow chart illustrating operations of the web server 160 according to a preferred embodiment of the present invention. Referring to FIG. 6, the web server 160 detects, at step 401, a web user demand for multimedia data stored in the MM box 150. The web server 160 identifies the access level of the web user, searches the multimedia data storage unit 151 of the MM box 150 to detect multimedia data having a disclosure level identical to the access level, and offers the multimedia data as sorted by storage directory, together with corresponding web data stored in the web management data storage unit 153, to the web user at step 403.

At step 405, the web server 160 updates the web management data storage unit 153 of the MM box 150 by storing data (for example, a simple text comment) input by the web user regarding specific multimedia data to correspond to the multimedia data. At step 407, the web server 160 determines if the web user inputs a demand for management of any multimedia data or storage directory. Upon detecting such a demand, the web server 160 confirms whether the access level assigned to the web server is the administrator access level at step 409. If the web user is not of the administrator access level, the web server 160 returns to step 407.

If the web server has the administrator access level, the web server 160 manages deletion, change of name, or change of disclosure level of specific multimedia data or storage directory according to the web user demand in step 411. Data generated in relation to such changes is stored in the web management data storage unit 153.

As described above, a mobile terminal 100 can send a multimedia message including multimedia data having a storage directory and a disclosure level set for the message. The MMSC 140 detects the corresponding storage directory in the MM box 150 or creates a new directory if the corresponding storage directory is not present in the MM box 150. The MMSC 140 stores multimedia data contained in the received multimedia message and the disclosure level set for the message in the detected or newly created storage directory.

When a web user accesses the web server 160 and requests specific multimedia data sent from the mobile terminal 100 and stored in the MM box 150, the web server 160 searches the MM box 150 to detect multimedia data having a disclosure level identical to the access level of the web user and provides the detected multimedia data to the web user in a manner similar to a general web page service. When the web user inputs any data (or comment) regarding the multimedia data, the web server 160 then stores the inputted data in the MM box 150 to correspond to the multimedia data. The user of the mobile terminal 100 can manage the multimedia data and storage directories in the MM box 150 through the web server 160.

For example, a process for sending image multimedia data to the MM box 150, storing the data in the MM box 150, and accessing the stored data via the web server 160 will be explained. When a user of a mobile terminal 100 inputs a request for sending an image multimedia message including image multimedia data, the mobile terminal 100 displays a multimedia message management menu so that the user can set a storage directory and a disclosure level of the image multimedia message. The mobile terminal 100 sends the image multimedia message including the directory and disclosure level information to the MM box 150.

The MMSC 140 analyzes the header information of the received multimedia message to identify the storage directory set by the user. The MMSC 140 stores the image data contained in the multimedia message and the disclosure level in the corresponding storage directory detected in the multimedia data storage unit 151.

When a web user requests the image data, the web server 160 confirms if the access level assigned to the web server is identical to the disclosure level set for the image data. If so, the web server 160 accesses the stored image data and corresponding web data stored in the web management data storage unit 153 and offers both data to the web user. The web user can input any data concerning the received image data. The web server 160 then stores the input data in the web management data storage unit 153.

In summary, a mobile user can set a storage directory and a disclosure level of a multimedia message that will be sent to and stored in the MM box. The MMSC detects a directory corresponding to the storage directory name inputted in the received multimedia message in the MM box or generates a new directory to store multimedia data contained in the multimedia message together with the disclosure level set for the multimedia message. When a web user requests specific multimedia data stored in the MM box, the web server searches the MM box to detect multimedia data having a disclosure level identical to the access level of the web user and offers the detected multimedia data to the web user in a manner similar to a general web page service.

Also, the web server stores any data inputted by the web user regarding the multimedia data in the MM box to correspond to the relevant multimedia data. According to the present invention, each mobile user can easily and effectively manage the stored multimedia data and the storage directories through the web server.

Although preferred embodiments of the present invention have been described for illustrative purposes, those skilled in the art will appreciate that various modifications, additions, and substitutions are possible, without departing from the scope and spirit of the present invention as disclosed in the accompanying claims, including the full scope of equivalents thereof.

What is claimed is:

1. A method for managing multimedia messages in a mobile communication system, comprising:
    sending a multimedia message including multimedia data having a storage directory and a disclosure level set by a user;
    storing, by a multimedia messaging center, the multimedia data included in the multimedia message in a directory of a multimedia message box corresponding to the set storage directory;
    detecting, by a web server, an access level of a web user requesting access to the multimedia data; and
    offering the multimedia data stored in the corresponding directory to the web user, when the detected access level is identical to the disclosure level set for the multimedia data.

2. The method as claimed in claim 1, wherein said disclosure level includes at least one an open access level allowing anyone accessing the web server to have complete and unrestricted access to the multimedia data, a group access level allowing only a specific group of people to access the multimedia data through the web server, and an administrator access level allowing only the registered user of the mobile terminals to access the multimedia data through the web server.

3. The method as claimed in claim 2, further comprising a step of managing the multimedia data and the storage directory when a web user having the administrator access level requests the management.

4. The method as claimed in claim 1, further comprising a step of storing web data input by the web user in relation to the multimedia data in the multimedia message box to correspond to the multimedia message.

5. The method as claimed in claim 4, wherein, the offering step further comprises the step of the web server offering corresponding web data stored in the multimedia message box, when offering the multimedia data.

6. The method as claimed in claim 4, wherein said web data is text data related with the multimedia data.

7. The method as claimed in claim 1, wherein the step of storing, by the multimedia messaging center, the multimedia data included in the multimedia message in the directory of the multimedia message box corresponding to the set storage directory further comprises:
    determining if the directory corresponding to the set storage directory is present in the multimedia message box;
    when the corresponding directory is present, storing the multimedia data included in the multimedia message in the present directory; and
    when the corresponding directory is not present, creating a new directory and storing the multimedia data included in the multimedia message in the new directory.

8. The method as claimed in claim 1, wherein said storage directory and disclosure level are included in header information of the multimedia message.

9. The method as claimed in claim 1, wherein said multimedia message box includes a multimedia data storage unit for storing the multimedia data included in the multimedia message and a web management data storage unit for storing web data generated by the web server.

10. The method as claimed in claim 1, wherein said multimedia data is image data.

11. A system for managing multimedia messages, comprising:
   a mobile terminal for sending a multimedia message including multimedia data having a storage directory and a disclosure level set according by a user;
   a multimedia messaging service center for storing the multimedia data included in the multimedia message in a directory of a multimedia message box corresponding to the set storage directory; and
   a web server for detecting an access level of a web user requesting access to the multimedia data, and offering the multimedia data stored in the corresponding directory to the web user, when the detected access level is identical to the disclosure level set for the multimedia data.

12. The system as claimed in claim 11, wherein said disclosure level comprises at least one of:
   an open access level allowing anyone accessing the web server to have complete and unrestricted access to the multimedia data;
   a group access level allowing only a specific group of people to access the multimedia data through the web server; and
   an administrator access level allowing only the registered user of the mobile terminals to access the multimedia data through the web server.

13. The system as claimed in claim 12, wherein said web server manages the multimedia data and the storage directory when a web user having the administrator access level requests the management.

14. The system as claimed in claim 11, wherein said web server stores web data input by the web user in relation to the multimedia data in the multimedia message box to correspond to the multimedia message.

15. The system as claimed in claim 14, wherein said web server offers the multimedia data together with the corresponding web data stored in the multimedia message box.

16. The system as claimed in claim 14, wherein said web data is text data related to the multimedia data.

17. The system as claimed in claim 11, wherein said multimedia messaging service center stores the multimedia data by determining if a directory corresponding to the set storage directory is present in the multimedia message box, when the corresponding directory is present, storing the multimedia data included in the multimedia message in the present directory, and when the corresponding directory is not present, creating a new directory and storing the multimedia data included in the multimedia message in the new directory.

18. The system as claimed in claim 11, wherein said storage directory and disclosure level are included in header information of the multimedia message.

19. The system as claimed in claim 11, wherein said multimedia message box comprises:
   a multimedia data storage unit for storing the multimedia data included in the multimedia message; and
   a web management data storage unit for storing web data generated by the web server.

20. The system as claimed in claim 11, wherein said multimedia data is image data.

* * * * *